United States Patent [19]

Doble

[11] Patent Number: 5,473,830
[45] Date of Patent: Dec. 12, 1995

[54] INFORMATION TAG

[76] Inventor: Keith M. W. Doble, P.O. Box 30, Norvalspont, 5981, South Africa

[21] Appl. No.: 259,494

[22] Filed: Jun. 14, 1994

[30] Foreign Application Priority Data

Jun. 15, 1993 [ZA] South Africa ............... 93/4240

[51] Int. Cl.⁶ ........................................ G09F 3/06
[52] U.S. Cl. ................................. 40/301; 40/300
[58] Field of Search ........................ 40/300, 301, 663, 40/668; 283/74, 75, 103

[56] References Cited

U.S. PATENT DOCUMENTS

| 3,184,874 | 5/1965 | Schofield | 40/301 |
| 3,360,877 | 1/1968 | Estep | 40/300 |
| 3,650,058 | 3/1972 | Wittcke et al. | 40/300 X |
| 4,706,610 | 11/1987 | Morgan, Jr. | 40/300 X |

FOREIGN PATENT DOCUMENTS 833800  2/1984  South Africa ............... 40/300

Primary Examiner—Kenneth J. Dorner
Assistant Examiner—James O. Hansen
Attorney, Agent, or Firm—Ladas & Parry

[57] ABSTRACT

An animal ear tag is disclosed which comprises two components and a pin which connects the components to one another and attaches them to the ear of the animal. The tag is constructed so that it is possible to record, on the animal itself, as much information as the farmer requires about it. Projections which can be removed or left in place, edge depressions the remaining material of which can be cut out or left in place, two sets of digital bars and two depressions for receiving colored studs enable the farmer to record as much information as he requires on the animal itself. The advantage of the system is that the information on the tag can be read directly from the tag and it is not necessary for the farmer to return to his office with only an identification number for the animal and then search for the information that he needs.

8 Claims, 2 Drawing Sheets

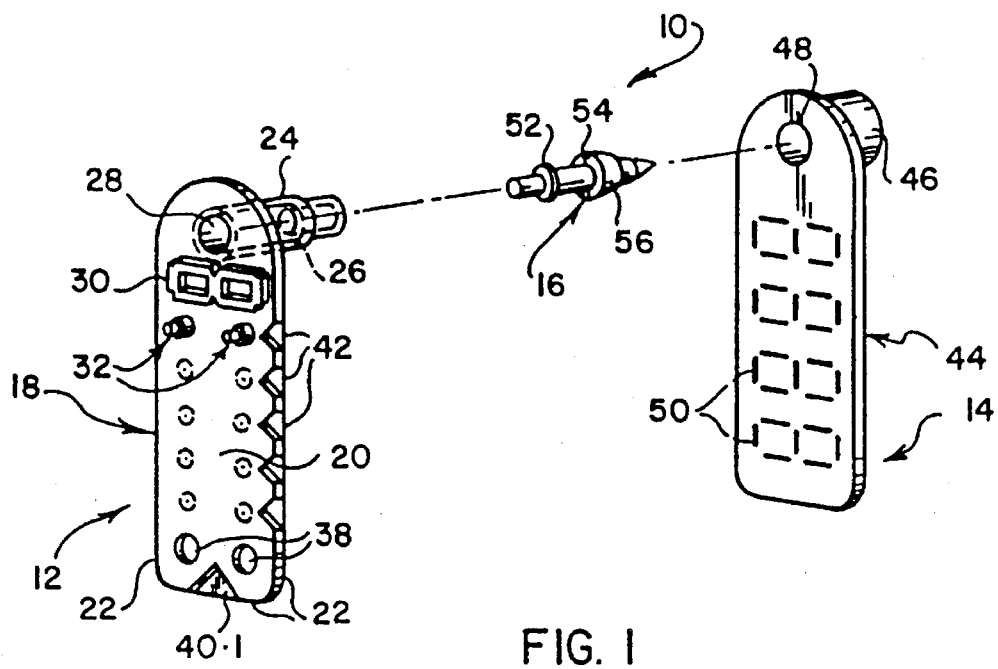

5,473,830

INFORMATION TAG

FIELD OF THE INVENTION

This invention relates to information tags particularly, but not exclusively, intended for use as animal ear tags.

BACKGROUND TO THE INVENTION

Farmers of livestock such as sheep, goats, pigs and cattle need to record information about each animal. The information recorded depends on the needs of each farmer. Thus the records needs of a wool farmer differ from those of a farmer breeding sheep for meat.

Conventionally an animal is fitted with an eartag to which a serial number is applied. The animal's pedigree, age, breeding record, wool production etc is then recorded either in a computer or in ledgers in the farmer's office. The serial number links the animal to the record.

The difficulty with this system is that once an animal has been located and its serial number read, the farmer must then return to his office to find out anything about the animal in question. This is a tedious procedure and the animal must then be located again in the herd if action is to be taken based on the information found in the record.

OBJECTS OF THE INVENTION

The main object of the invention is to provide an identification tag on which information can be recorded.

Another object of the invention is to provide an information tag on which information can be recorded and which can be read-off the tag without the necessity of consulting any other record.

BRIEF SUMMARY OF THE INVENTION

According to one aspect of the present invention there is provided an information tag in the form of a member having means for attaching it to an object. Information about the object is to be recorded on the tag. The member comprising a major surface which lies in a plane and a set of elements which are so configured that they can readily be severed from the remainder of said member, the presence or absence of all or part of any element being detectable by visual inspection, and each element having at least a portion thereof located away from said plane.

Each element can be in the form of a projection protruding from said plane. Desirably the member is a molding of synthetic plastics material, said elements being in the form of hollow pegs which are moulded integrally with said member, the member having holes therein, each hole communicating with the hollow interior of a peg.

In another form said member is also a molding of synthetic plastics material, said elements being layers, integral with the remainder of the member, and which form the bases of depressions in said member, said layers being thinner than said member.

According to a further aspect of the present invention there is provided an information tag comprising a member of injection molded synthetic plastics material and means for attaching said member to an object. Information about the object is to be recorded on the tag. The tag comprises a first set of elements integrally molded with said member and a second set of elements integrally molded with said member, the elements of the first set being of a different configuration than the elements of the second set, and both sets of elements being configured so that they can readily be severed from the remainder of said member. The presence or absence of all or part of any element is detectable by visual inspection.

The elements can have many different configurations. In one form said elements are projections protruding from a planar surface of said member. In this form each projection can be externally stepped so as to provide a smaller part surmounting a larger part, the larger part merging with said planar surface. Desirably the projections are hollow and there are holes which pass through said member and communicate with the hollow interiors of said projections. Whilst the projections can be of other cross-sectional shapes it is preferred that they be of circular cross-section in planes parallel to said planar surface.

In another form there are depressions in said member, the base of each depression being constituted by a layer of plastics material which is thinner than the parts of said member adjacent said depressions, said layers forming a set of elements. Preferably said depressions are triangular in plan view, one edge of each depression coinciding with an edge of said member. In yet another form said depressions are circular.

Said information tag can further include elements in the form of groups of hollow protruding bars arranged in the form of a digital "8". To increase the quantity of information that can be stored there can be a plurality of sets of pins which can be attached to said member, the pins of each set all being of the same color, and the pins of different sets being of different colors. The preferred method of fixing the pins to the member comprises providing holes in said layers of said circular depressions to facilitate passage of the pins through said layers.

Where the tag is specifically for use as an animal ear tag it can include a further member and a pin, the members each including a hollow sleeve through which the pin can be pushed to affix the tag to an animal's ear with the members one on each side of the ear and the pin passing through the ear.

According to yet another aspect of the present invention there is provided a method of recording information on an information tag which comprises injection molding a member which has a major surface which lies in a plane and a set of elements which are integral with said member and which are so configured that they can readily be severed from the remainder of said member, each element having at least a portion thereof located away from said plane, said member and set of elements forming said tag, and cutting off selected ones of said elements to record information.

BRIEF DESCRIPTION OF THE DRAWINGS

For a better understanding of the present invention, and to show how the same may be carried into effect, reference will now be made, by way of example, to the accompanying drawings in which:

FIG. 1 is an "exploded" pictorial view of an ear tag for an animal such as a sheep or a goat;

FIG. 2 is an elevation of the lower part of another of the components of the ear tag;

FIG. 3 is a section, to a large scale, on the line III—III of FIG. 2;

FIG. 4 is a rear elevation of the lower part of another component of the ear tag;

FIG. 5 is a section, to a larger scale, on the line V—V of FIG. 4;

DETAILED DESCRIPTION OF THE DRAWINGS

Figure 7:
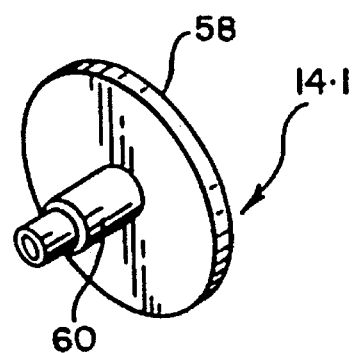
FIG. 7 is a pictorial view of a second component of the ear tag of FIG. 6.

Referring firstly to FIG. 1, the ear tag is generally designated 10 and comprises a first component 12, a second component 14 and a pin 16.

The component 12 is injection molded in synthetic plastics material and includes a planar part 18 which has a main face 20 and edges 22. The component 12 also includes a sleeve 24 which projects from that face of the planar part 18 which is opposed to the main face 20. The sleeve 24 has a bore 26 therein, the bore 26 being stepped and registering with a hole 28 in the planar part 18. As will be described in more detail hereinafter, the bore 26 receives the pin 16.

Protruding from the main face 20 is a series of bars 30, the bars being arranged in the form of a digital "8" which is on its side. The construction of the bars 30 will be described in more detail with reference to FIGS. 4 and 5. By cutting away bars 30 or by coloring the top surfaces of the bars, also as described in more detail with reference to FIGS. 4 and 5, any single digit number can be provided.

Below the bars 30 there are two rows of hollow projections 32 (see particularly FIG. 3). Each projection 32 is stepped so as to provide a smaller diameter part 34 surmounting a larger diameter part 36. The projections 32 can be snipped off either entirely, that is, flush with the main face 20 or where the parts 34 and 36 merge. In FIG. 1, for the sake of illustration, the top two projections 32 are shown in full. The others have been cut-off entirely leaving just the hole.

Below the projections 32 are two depressions 38 in the main face 20. The depth of each depression is just slightly less than the thickness of the planar part 18 so that the base of each depression is formed by a thin, weak film of synthetic plastics material.

Triangular depressions 40 are formed along one of the longer edges 22 of the planar part 18. The number of depressions 40 equals the number of rows of projections 32. The depth of each depression 40 is less than the thickness of the planar part 18 so that the base of each depression 40 is constituted by a thin layer 42 of synthetic plastics material. This layer is best seen in FIG. 3. A larger triangular depression 40.1, of exactly the same construction as the depressions 40, is formed in the lower transverse edge 22 of the planar part 18. The thin layer at the base of this depression is designated 42.1.

Turning now to the component 14, this is also injection molded in synthetic plastics material and comprises a planar part 44 and a sleeve 46 which protrudes from that face of the planar part 44 which is hidden in FIG. 1. The sleeve 46 registers with a hole 48 in the planar part 44. Between its ends the bore of the sleeve 46 is stepped so that it includes a smaller diameter part and a larger diameter part, the smaller diameter part being at the end of the bore which is contiguous with the hole 48.

A series of bars 50 protrude from that face of the planar part 44 which is illustrated in FIG. 4 but is not visible in FIG. 1. The bars 50 are hollow and each group is arranged in the form of a digital "8" which is on its side. It will be understood that the top surfaces of the bars, that is, the surfaces which are visible in FIG. 4, can be marked with an indelible ink so as the provide a four digit number. By way of example, if all the top surfaces are colored then the number is 8888. If the cross bars are not colored, then the number becomes 0000. Any number between 0001 and 9999 can be obtained by coloring the top surface of appropriate bars. Alternatively, cutting away of the bars achieves the same end.

Various ways in which the tag can be used will be discussed in more detail below.

To fit the tag to an animal's ear, the pin 16 is pushed into the bore 26 of the sleeve 24 so that the enlarged ring 52 of the pin 16 slides through the smaller diameter part of the bore 26, opening it out as it does so and then enters the larger diameter part of the bore 26. The step in the bore 26 prevents the pin thereafter being withdrawn without destroying the tag. The step 54 at the rear of the head 56 of the pin 16 is now a short distance from the free end of the sleeve 24.

The component 18 with the pin attached is placed on one side of the animal's ear and the component 14 is placed on the other side with the head 56 of the pin 16 aligned with the bore 48. The two components are then pressed together using a crimping tool. The head 56 passes through the animal's ear and into the bore of the sleeve 46. The entire head 56 passes through the smaller diameter part of the bore in the sleeve 46 opening it up as it does so. The head 56 then enters the larger diameter part of the bore in the sleeve 46 and the step 54 at the rear of the head prevents the pin thereafter being withdrawn from the sleeve 46 without destroying the sleeve 46.

Figure 6:
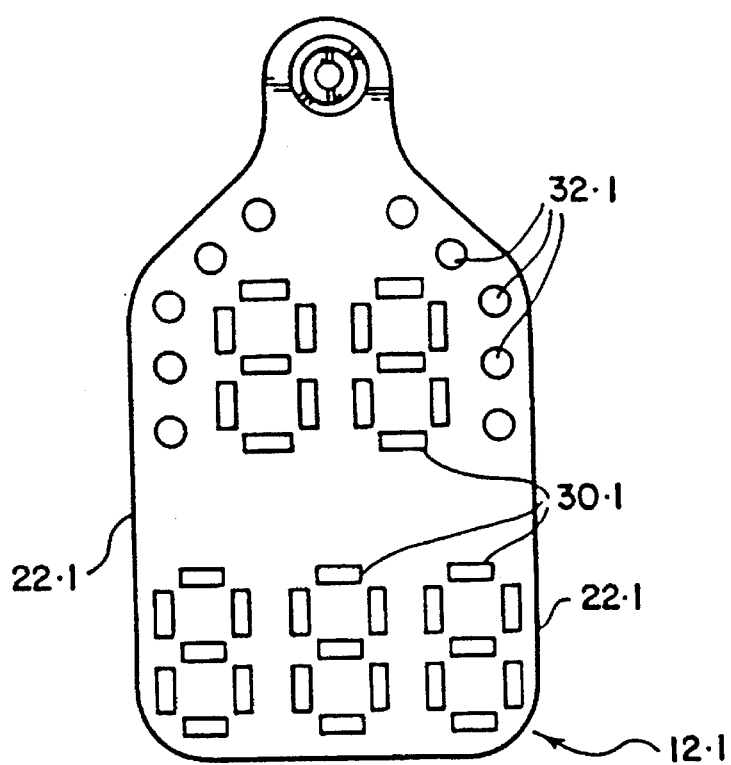
FIG. 6 is an elevation of the main component of an ear tag for a larger animal such as a cow.

The ear tag of FIGS. 6 and 7 has much in common with the ear tag of FIGS. 1 to 5. Where applicable, therefore, like parts have been designated using like reference numerals with the addition of the suffix ".1".

In the form of FIGS. 6 and 7, the second component 14.1 is in the form of a disc 58 with a hollow sleeve 60 protruding therefrom. The disc 58 does not carry any means of providing information.

Five sets of bars 30.1 are provided on the component 12.1 so that a two digit number and a three digit number can be created by coloring the surfaces of the bars or by cutting the bars away. The projections 32.1 differ from the projections 32 only in that they are not stepped but are of hollow cylindrical form. The edges 22.1 of the component 12.1 are not provided with any depressions of the form illustrated at 40 and 40.1 in FIG. 2 but these could, of course, be provided if desired.

The ear tag 10.1 is mounted on the ear of the animal in the same manner as described above with reference to FIG. 1. The pin required is not illustrated in FIG. 6 and 7.

Stock farmers, and particularly those with a breeding program, need to keep a substantial amount of information regarding their herds. Each farmer chooses to record whatever information best suits his purposes. In the following portion of the description an indication is given as to various ways in which the data recordal facilities of the ear tags can be used. It will be understood, however, that the tags are capable of recording information in any way that the farmer requires it. The following is, therefore, simply by way of illustration.

The bars 30—These bars can be colored or cut away to indicate the year in which the animal to which the tag is fitted is first expected to lamb. Only the last digit of the year is necessary to identify this year.

The depression 40.1—This can be cut away or left, depending on the system adopted, to indicate whether the animal was a singleton or a twin.

The color of the tag—A different color can be used to indicate the year in which the animal was born. The farmer can pick a different color for each year.

The bars 50—These are marked and/or cut away to provide a four digit identification number for the animal in question.

All the information set out above is entered on the tag prior to the tag being attached to the animal's ear. The farmer now knows the year the animal was born, the year in which it should have its first lamb, whether it was a singleton or a twin, and the animal's identification number. This number can be entered up in another record, such as a computerised record.

When the ewe first lambs, the projections 32 are cut away to indicate whether it was a single birth, twins or triplets. This can De achieved in a number of different ways. It will be noted that the projections 32 are in five rows with two projections in each row. The row closest to the bars 30 records the ewe's performance in the first year, the next row of projections 32 the ewe's performance in the second year and so on. By cutting off entirely one of the projections 32, the farmer can record that the ewe had a single lamb. By cutting off both projections in the top row entirely the farmer can record that the ewe had twins. By cutting off only the portion 34 of one or both projections 32 the farmer can record triplets. There are many combinations involving cutting off projections 32 in their entirety, or in cutting off one or more portions 34. This facility also permits the farmer to record births where the ewe lambs twice in a single season.

As explained above, each depression 40 is aligned with one of the horizontal rows of depressions 32. By leaving the layer 42 in or removing it, depending on the system adopted, the farmer can record whether the ewe lambed in the first half of the year or the second half of the year. This facility is important to a farmer who is breeding lambs for meat. If the farmer is breeding for wool, then the layers 42 can be cut away to indicate that the ewe has had a lamb in that particular year. The number of lambs born is not that significant. The projections 32 can then be cut off, on any system that suits the farmer, to indicate the grade of fleece which is produced when the sheep is sheared.

Finally, colored studs can be pushed through the thin layers of material which close-off the depressions 38 to indicate any other information that the farmer requires. By way of example, the studs could indicate where the particular animal was purchased, that is, from a specific breeder, and which ram she was mated with. These holes can also carry studs which indicate whether, when the ewe is scanned for pregnancy, she appears to be barren, have a singleton or twins. Thus an array of differently colored studs which can be pressed into the depressions 38 can be used to provide ancillary information.

Insofar as the tag of FIGS. 6 and 7 is concerned, numerical information can be provided using the bars 30.1 and other information can be provided by cutting off, or not cutting off depending on the system used, the projections 32.1.

Whilst primarily intended as an ear tag for an animal, and described as such, it will be understood that the components 12 and 12.1 could be used to provide information on equipment such is used in a factory. For example, by appropriate markings on the component, cutting away suitable parts and so on, the date of purchase of the machinery, the service record, production records, breakdown records etc can be recorded on a tag which is attached to the machine itself. Inspection of the tag will thus reveal whether the machinery is in need of a service etc.

The tag 12.1 can, if desired, be provided with a row of depressions, equivalent to the depressions 38, for receiving colored pins thereby to increase the quantity of information that can be recorded.

I claim:

1. A tag for recording information about an animal comprising a member molded from synthetic plastic material, the member including means for attaching it to the animal, the member having a major surface which lies in a plane; a set of projections which are molded integrally with the member and which protrude from said major surface, said projections configured so that they can readily be severed from said member, said projections having hollow interiors, the member having holes therein and said holes communicating with the hollow interiors of said projections and an absence or presence of all or any part of any projection being detectable by visual inspection.

2. A tag according to claim 1 in which each projection is stepped and has a larger diameter part and a smaller diameter part, said larger diameter part being between said surface and said smaller diameter part.

3. A tag for recording information about an animal, comprising a member of injection molded synthetic plastic material and means for attaching said member to an animal, the member including a major part having a planar surface, a first set of elements in the form of projections which are configured so that they can readily be severed from said major part, said projections are molded integrally with said major part, and protrude from said planar surface, the projections having hollow interiors, said major part having holes therein which communicate with said hollow interiors of said projections, and a second set of elements which are of a different configuration from the first set of elements and are also configured so that they can readily be severed from said major part, the presence or absence of all or part of any element of either set being detectable by visual inspection.

4. A tag according to claim 3 in which each projection is stepped and has a larger diameter part and a smaller diameter part, said larger diameter part being between said surface and said smaller diameter part.

5. A tag for recording information about an animal comprising a major part and means for attaching the tag to said animal, the tag being molded in synthetic plastic material and said major part having a surface which lies in a plane, a first set of information recording elements in the form of integrally molded projections which protrude from said surface and which projections can readily be cut off thereby to enable information to be recorded, said projections having hollow interiors, said surface having holes therein, said holes communicating with the hollow interiors of said projections, and a second set of information recording elements which are in the form of depressions having bases constituted by thin layers of synthetic plastic material and the layers being integral with said major part.

6. A tag according to claim 5, in which each projection is stepped and has a larger diameter part and a small diameter part, said larger diameter part being between said surface and said smaller diameter part.

7. A tag according to claim 5 in which said thin layers of synthetic plastics material are triangular in plan view, one edge of each layer coinciding with an edge of said major part.

8. A tag for recording information about an animal comprising a major part and means for attaching the tag to said animal, the tag being molded in synthetic plastics material and said major part having a surface which lies in a plane, information recording elements in the form of a plurality of groups of protruding bars, the bars of each group being arranged in the form of a digital "8", said elements being integrally molded with said major part and protruding from said surface, said bars being so configured that they can readily be cut off to enable information to be recorded, and a second set of information recording elements which can be cut off to enable further information to be recorded.

* * * * *